United States Patent
Wei

(10) Patent No.: US 11,886,034 B2
(45) Date of Patent: Jan. 30, 2024

(54) LENS MODULE AND ELECTRONIC DEVICE

(71) Applicant: AAC Optics Solutions Pte. Ltd., Singapore (SG)

(72) Inventor: Chuandong Wei, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 733 days.

(21) Appl. No.: 16/991,028

(22) Filed: Aug. 12, 2020

(65) Prior Publication Data

US 2021/0003810 A1    Jan. 7, 2021

Related U.S. Application Data

(63) Continuation of application No. PCT/CN2019/094196, filed on Jul. 1, 2019.

(51) Int. Cl.
*G02B 7/02* (2021.01)
*G02B 13/18* (2006.01)

(52) U.S. Cl.
CPC ............. *G02B 7/026* (2013.01); *G02B 7/021* (2013.01); *G02B 13/18* (2013.01)

(58) Field of Classification Search
CPC .......... G02B 7/02; G02B 7/021; G02B 7/022; G02B 7/023; G02B 7/025; G02B 7/026; G02B 7/027; G02B 7/028
See application file for complete search history.

(56) References Cited

U.S. PATENT DOCUMENTS

| | | | | |
|---|---|---|---|---|
| 2011/0075021 A1* | 3/2011 | Chang | ................... | G02B 7/022 348/374 |
| 2019/0285832 A1* | 9/2019 | Suzuki | ................... | G02B 7/102 |
| 2019/0346652 A1* | 11/2019 | Tsai | ....................... | G02B 7/021 |

* cited by examiner

*Primary Examiner* — Ephrem Z Mebrahtu
(74) *Attorney, Agent, or Firm* — W&G Law Group

(57) ABSTRACT

A lens module and an electronic device include a lens barrel and an optical component. The lens barrel includes a barrel wall and a clamping member protruding from a first inner side wall of the barrel wall. The clamping member includes a second inner side wall close to the optical axis. The second inner side wall of the clamping member is a sloped surface on a section paralleled to the optical axis, and the sloped surface is inclined from the object side to the image side toward a direction close to the optical axis. The clamping member is resisted against an outer side of the optical component. Thus, when the optical component is engaged with the clamping member, a single optical component can be smoothly fixed and arranged on the clamping member at the corresponding position.

11 Claims, 5 Drawing Sheets

LENS MODULE AND ELECTRONIC DEVICE

FIELD OF THE PRESENT INVENTION

The present invention relates to the technical field of optical imaging, and more particularly to a lens module and an electronic device.

DESCRIPTION OF RELATED ART

An existing lens module usually includes a lens barrel, a lens group accommodated in the lens barrel, a light shielding sheet sandwiched and arranged between adjacent lenses in the lens group, and a press ring engaged with the underlying lens on the image side. As technical performance requirements are driven higher, the lens group generally includes multiple lenses in order to ensure the imaging quality. Some of these lenses are glass lenses, while some are plastic lenses. Except for different materials, their shapes and structures are generally different. Obviously, the lenses in the lens group are mixed and assembled together. Specifically, an image side of an adjacent lens is generally placed on an object side of the other lens, or multiple lenses are stacked, and the outer side wall of each lens also needs to be engaged with the inner side wall of the lens barrel. Besides, the light shielding sheet, the press ring and other components also need to be engaged with the inner wall of the lens barrel and the corresponding lens. However, in the actual installing process, since the lens barrel is generally a complete structure by injection molding, its assembled method is relatively simple, so it is difficult to ensure the coaxiality and stability among the lenses, light shielding sheets, the press rings and other components. As a result, the installation difficulty is increased, so that the imaging quality of the lens module is affected.

Therefore, it is desired to provide a new lens module to solve the above-mentioned problem.

SUMMARY OF THE PRESENT INVENTION

The purpose of the present invention is to provide a lens module to solve the technical problem that large installation difficulty of each component in the existing lens module will affect the imaging quality easily.

In order to achieve the above purpose, the present invention provides a lens module, which includes a lens barrel and an optical component. The lens barrel includes a barrel wall and a receiving cavity. The barrel wall includes a first inner side wall near an optical axis and a first outer side arranged opposite to the first inner side wall, and a receiving cavity for accommodating the optical component is surrounded by the first inner side wall. The optical component includes an object side, an image side arranged opposite to the object side, and an outer side connecting the object side and the image side and far from the optical axis. The optical component includes a first optical member.

The lens barrel further includes a clamping member protruding from the first inner side wall, and the clamping member is extended from the object side to the image side. The clamping member includes a second inner side wall close to the optical axis.

The second inner side wall of the clamping member is a sloped surface on a section paralleled to the optical axis, and the sloped surface is inclined from the object side to the image side toward a direction close to the optical axis. The second inner side wall is resisted against the outer side of the first optical member.

As an improvement, the clamping member is provided with at least one notch on a side close to the image side. In the radial direction of the barrel wall, each notch is extended from the second inner side wall toward a direction far from the optical axis.

As an improvement, the lens module is provided with a plurality of notches, and the plurality of notches are evenly distributed around the optical axis along the same circumferential direction of the clamping member.

As an improvement, the clamping member further includes a second outer side wall opposite to the second inner side wall, and a groove is formed between the second outer side wall and the first inner side wall.

As an improvement, a smooth transition is configured between the second outer side wall and the second inner side wall.

As an improvement, an angle between the second inner side wall and the optical axis is ranged from 0 degree to 20 degrees.

As an improvement, the optical member further includes a second optical member, the first optical member and the second optical member are sequentially distributed and adjacently arranged in a direction from the object side to the image side.

A supporting surface is formed on the first inner side wall of the barrel wall, the supporting surface is resisted against the object side surface of the second optical member. The supporting surface is flush with the image side surface of the first optical member or there is a gap between the supporting surface and the image side surface of the first optical member.

As an improvement, the first optical member is a lens, the second optical member is a light shielding member. Or the first optical member and the second optical member are two different types of light shielding members.

As an improvement, the light shielding member is a light shielding plate or a light shielding sheet.

The purpose of the present invention further provides an electronic device which includes the above-mentioned lens module.

The beneficial effect of the present invention lies in that: the clamping member is protruded from the first inner side wall of the barrel wall of the lens barrel, wherein the clamping member is extended from the object side to the image side. The second inner side wall of the clamping member is a sloped surface on a section paralleled to the optical axis, and the sloped surface is inclined from the object side to the image side toward a direction close to the optical axis. Thus, when the outer side of the first optical member is engaged with the second inner wall of the clamping member, the first optical member can be smoothly arranged at the corresponding installing position of the clamping member with the support of the second inner side wall. Therefore, it is advantageous to ensure the coaxiality and installation stability of each optical component. In addition, it is also convenient for demolding and pulling-out molding.

Figure 1:
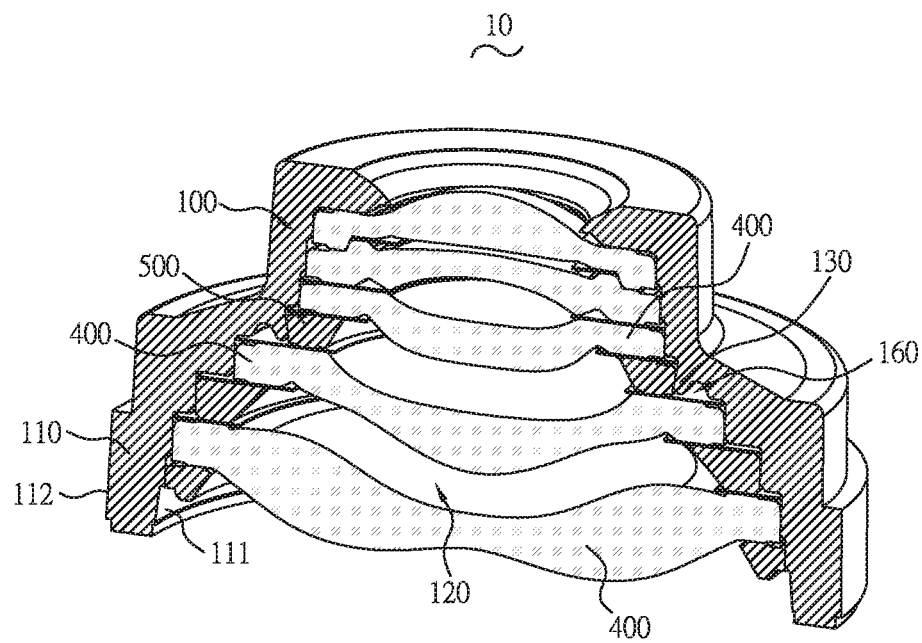
FIG. 1 is a cross-sectional view of a lens module in a first embodiment of the present invention.

The reference numerals in the drawings are as follows:

electronic device 1, lens module 10, optical axis OO', lens barrel 100, barrel wall 110, first inner side wall 111, supporting surface 1111, first outer side wall 112, receiving cavity 120, clamping member 130, second inner side wall 131, second outer side wall 132, image side wall 133, step 140, notch 150, groove 160, first optical member 200, object side surface 210, image side surface 220, outer side surface 230, second optical member 300, lens 400, light shielding plate 500, light shielding sheet 600.

DETAILED DESCRIPTION OF THE EXEMPLARY EMBODIMENT

The present invention will be further described below with reference to the drawings and embodiments.

Figure 2:
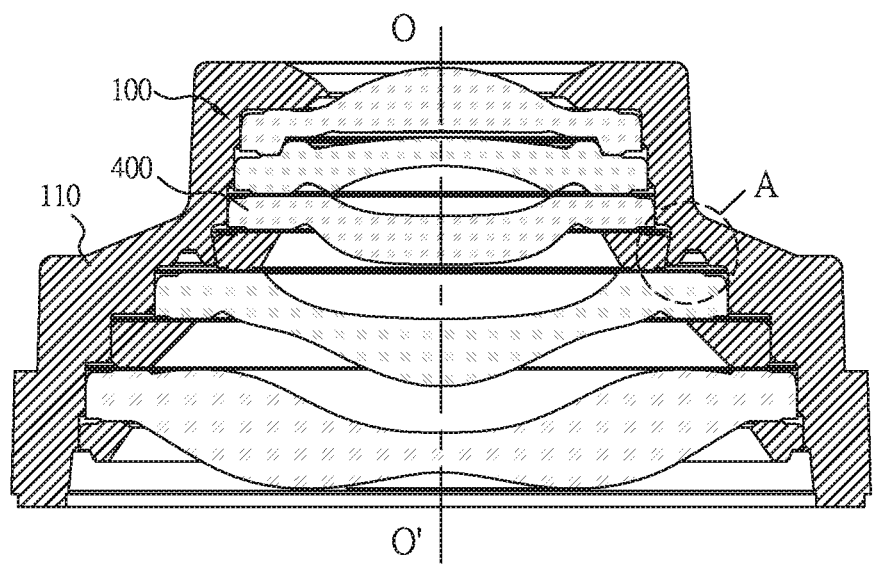
FIG. 2 is a front view of the lens module in FIG. 1.
Figure 3:
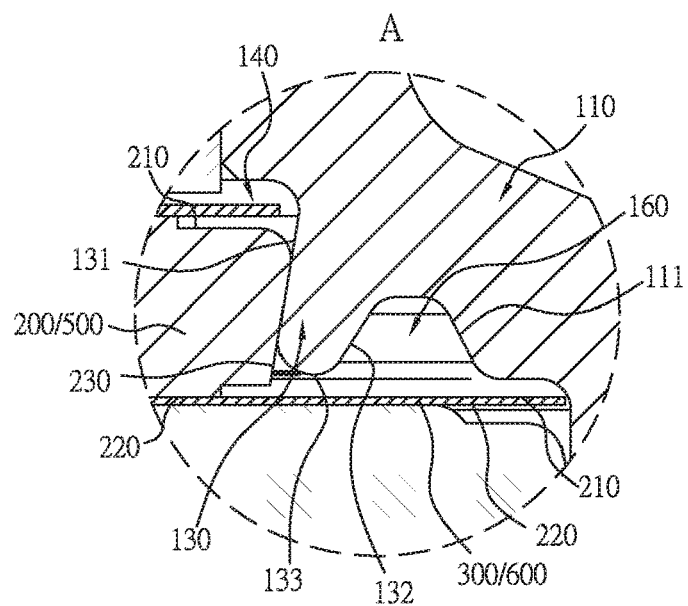
FIG. 3 is a partially enlarged view of part A in FIG. 2.

As shown in FIG. 1 to FIG. 3, in the first embodiment, the present invention provides a lens module 10, which generally includes a plurality of lenses 400 and at least two light shielding members sandwiched between two adjacent lenses 400. The lens module 10 further includes a lens barrel 100, wherein each light shielding member and each lens 400 are accommodated in a receiving cavity 120 of the lens barrel 100.

It should be noted that the structures of the plurality of lenses 400 may be the same or different. Correspondingly, the materials of the plurality of lenses 400 may be the same or different. In addition, the number of the lenses 400 is selectable, that is, the specific installing number of the lenses 400 may be determined according to practical conditions. Understandably, the lens module 10 may be assembled and mixed with different lenses in this embodiment. For the convenience of description, a structure of five lenses 400 is used as an example for illustrating.

Similarly, the number of light shielding members may be selectable, and the specific number can also be determined according to the practical conditions. Specifically, the light shielding member may be a light shielding plate 500 or a light shielding sheet 600 in this embodiment.

To facilitate the installating of each component in the lens module 10, the first embodiment of the present invention provides a new lens barrel 100, and the following is a specific description of the lens barrel 100.

As shown in FIG. 1 to FIG. 3, the lens barrel 100 of the lens module 10 includes a barrel wall 110 and a receiving cavity 120, wherein the barrel wall 110 includes a first inner side wall 111 near the optical axis OO' and a first outer side wall 112 arranged opposite to the first inner side wall 111. The receiving cavity 120 is surrounded by the first inner side wall 111, and a plurality of optical components are accommodated in the receiving cavity 120. The optical components include a first optical member 200 and a second optical member 300. The first optical member 200 and the second optical member 300 are sequentially arranged in a direction from an object side to an image side, and the first optical member 200 and the second optical member 300 are arranged adjacent to each other. Understandably, during the reverse module installing, the first optical member 200 is arranged first in general, and then the second optical member 300 is arranged.

It should be noted that, generally, the first optical member 200 may be one of the lenses 400 in the first case. Correspondingly, the second optical member 300 may be one of the light shielding members. For example, the second optical member 300 may be a light shielding plate 500 or a light shielding sheet 600 adjacent to the front-arranged lens 400. Alternatively, in the second case the first optical member 200 and the second optical member 300 may be two different types of light shielding members respectively. Namely, the first optical member 200 may be a light shielding plate 500, while the second optical member 300 may be a light shielding sheet 600. Alternatively, the first optical member 200 may be a light shielding sheet 600, while the second optical member 300 may be a light shielding plate 500.

Specifically, as an example for description, mainly let the first optical member 200 be a light shielding plate 500 and the second optical member 300 be a light shielding sheet 600 in the embodiment.

In the embodiment, as shown in FIG. 3, both the first optical member 200 (for example, a light shielding plate 500) and the second optical member 300 (for example, a light shielding sheet 600) generally include an object side surface 210, an image side surface 220 arranged opposite to the object side surface 210, and an outer side surface 230 connecting the object side surface 210 and the image side surface 220 and away from the optical axis OO'.

As shown in FIG. 1 to FIG. 3, the lens barrel 100 further includes a clamping member 130 protruding from the first inner side wall 111 of the barrel wall 110, and the clamping member 130 is extended from the object side to the image side. Understandably, the clamping member 130 is an auxiliary installing component, which is protruded on the inner side wall of the existing lens barrel 100. As shown in FIG. 2 and FIG. 3, the clamping member 130 includes a second inner side wall 131 near the optical axis OO' and an image side wall 133 connected to the second inner side wall 131 on the image side. In order to facilitate installation of the first optical member 200 (for example, the shielding plate 500) on the object side of the lens barrel 100, a step 140 is formed between the second inner side wall 131 of the clamping member 130 and the first inner side wall 111 of the barrel wall 110. As shown in FIG. 3, the first optical member 200 is arranged on the step 140, and the second inner side wall 131 of the clamping member 130 is resisted against the outer side surface 230 of the first optical member 200. That is, the first optical member 200 is engaged with the clamping member 130. In addition, as shown in FIG. 3, in order to prevent the clamping member 130 from interfering with the second optical member 300, there is a gap between the image side wall 133 of the clamping member 130 and the object side surface 210 of the second optical member 300.

Figure 6:
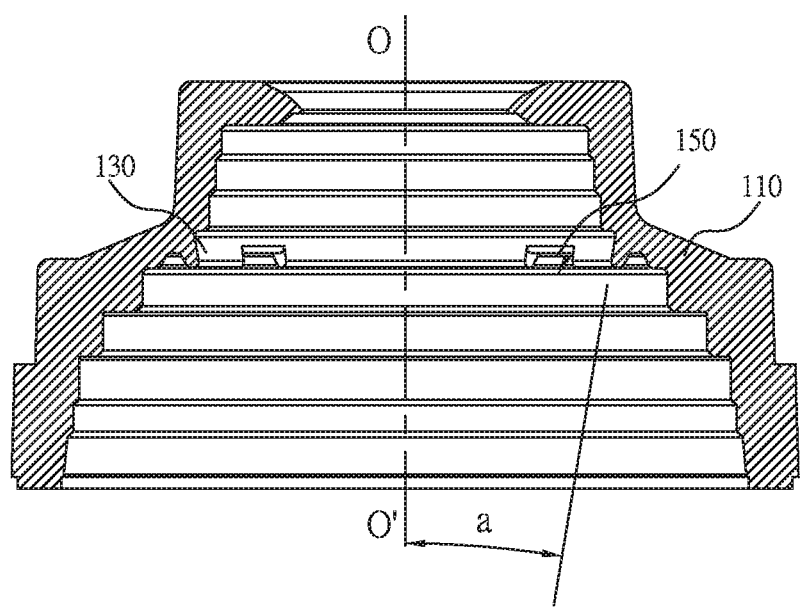
FIG. 6 is a front view of the lens barrel in FIG. 5.

As shown in FIG. 1 and FIG. 3, the second inner side wall 131 of the clamping member 130 is a sloped surface on a section paralleled to the optical axis OO', and the sloped surface is inclined from the object side to the image side toward a direction close to the optical axis OO'. Specifically, as shown in FIG. 6, an angle between the second inner side wall 131 of the clamping member 130 and the optical axis OO' is ranged from 0 degree to 20 degrees in this embodiment. Thus, as shown in FIG. 1, after the first optical member 200 is arranged in the direction from the image side to the object side, with the help of the sloped surface, the first optical member 200 can be firmly arranged in the range limited by the step 140 without falling to the image side during use. That is, it is beneficial to improve the installation stability of the first optical member 200. Besides, the second optical member 300 will not be pressed.

Furthermore, as shown in FIG. 2, FIG. 3, FIG. 5 and FIG. 6, the clamping member 130 is provided with at least one notch 150 on a side close to the image side. In the radial direction of the barrel wall 110, each notch 150 is extended from the second inner side wall 131 toward the direction away from the optical axis OO', so that the first optical member 200 (for example, the light shielding plate 500) can be divided into a plurality of segments in its circumferential direction. That is, the engaged surface between the first optical member 200 and the clamping member 130 is divided into several sections, which provides space for deformation of the first optical member 200 at the position corresponding to each notch 150. That is, the first optical member 200 may be deformed at the position corresponding to the notch 150 when being demolded or pulling-out molded, so it is convenient for demolding and pulling-out molding the first optical member 200 (for example, the light shielding plate 500).

Figure 4:
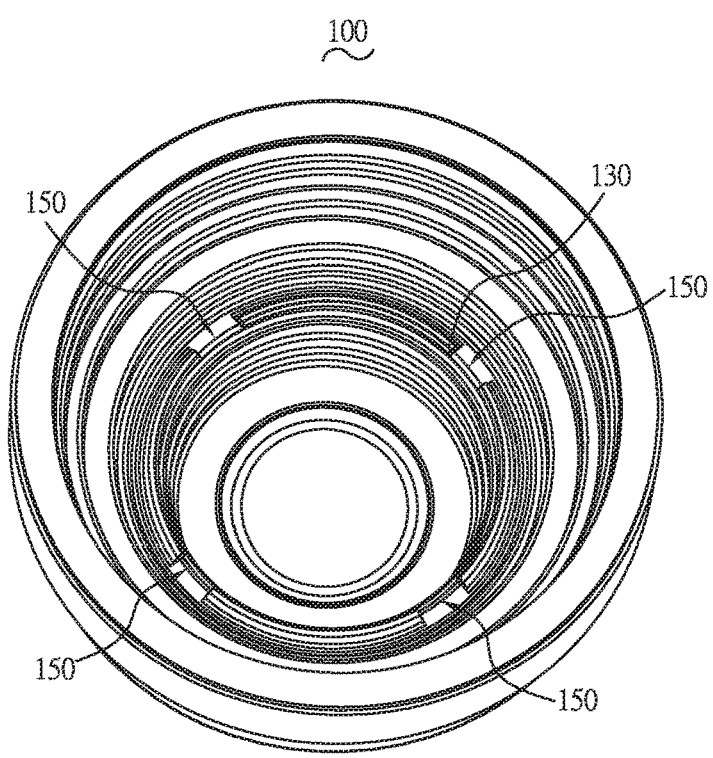
FIG. 4 is a perspective structural view of a lens barrel in FIG. 1.
Figure 5:
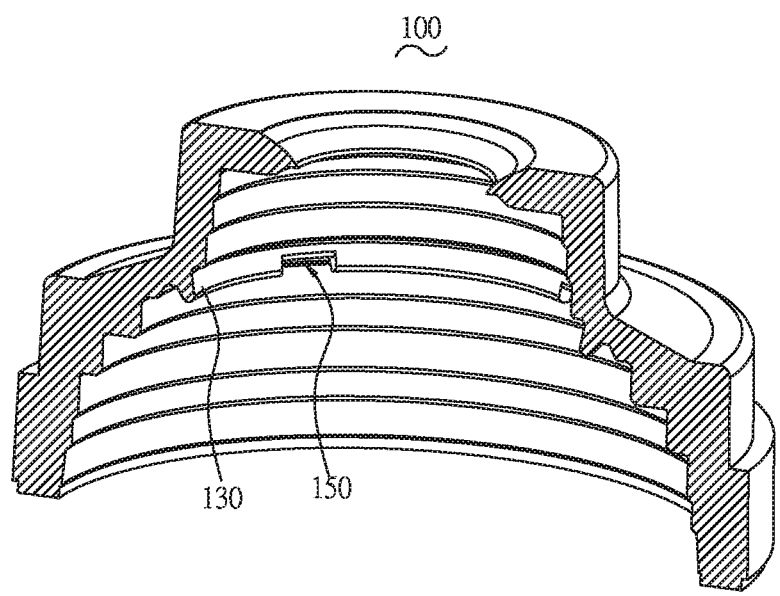
FIG. 5 is a perspective cross-sectional view of the lens barrel in FIG. 4 from a certain viewing angel.

When there are a plurality of notches 150, the plurality of notches 150 are evenly distributed around the optical axis OO' along the same circumferential direction of the clamping member 130. Thus, it can hereby be ensured that the first optical member 200 (for example, light shielding plate 500) may be deformed uniformly, thereby improving the assembled stability of the lens module 10. Specifically, as shown in FIG. 4, four notches 150 are provided in this embodiment, so that the first optical member 200 can be divided into four segments in the circumferential direction. Correspondingly, the first optical member 200 may be deformed at the four notches 150. In fact, the number of notches 150 can also be 2, 6 or 8 etc., that is to say, the number of notches 150 is an even number, so as to ensure the uniformity of deformation. Of course, the number of the notches 150 may be an odd number, as long as all the notches 150 can be evenly distributed around the optical axis OO'.

Furthermore, in a preferred implementation of the embodiment, as shown in FIG. 3, the clamping member 130 further includes a second outer side wall 132 arranged opposite to the second inner side wall 131, wherein a groove 160 is formed between the second outer side wall 132 of the clamping member 130 and the first inner side wall 111 of the barrel wall 110, so the first optical member 200 can also be deformed into the groove 160. Of course, since the groove 160 is communicated with the receiving cavity 120, therefore the second optical member 300 may also be deformed at a position corresponding to the groove 160. Obviously, it is also advantageous for demolding and pulling-out molding of the first optical member 200 and the second optical member 300 during the assembling process.

Furthermore, in a preferred implementation of this embodiment, as shown in FIG. 3, in order to prevent the first optical member 200 and/or the second optical member 300 from being scratched during deformation, on the object side, a smooth transition is arranged between the second outer side wall 132 of the clamping member 130 and the first inner side wall 111 of the barrel wall 110. Specifically, the second outer side wall 132 is connected to the first inner side wall 111 through an arc-shaped wall.

Furthermore, in a preferred implementation of this embodiment, as shown in FIG. 3, a smooth transition is arranged between the second outer side wall 132 of the clamping member 130 and the second inner side wall 131 of the clamping member 130 in order to prevent the first optical member 200 and/or the second optical member 300 from being scratched during deformation. Specifically, the second outer side wall 132 is connected to the second inner side wall 131 through an image side wall 133, wherein the image side wall 133 is preferably a circular arc wall.

Figure 7:
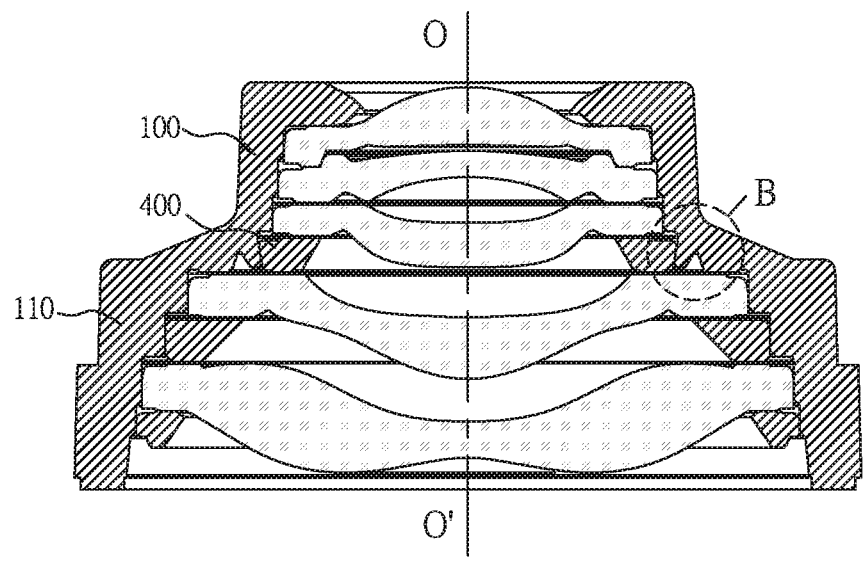
FIG. 7 is a cross-sectional view of the lens module according to a second embodiment of the present invention from a certain viewing angel, wherein the lens barrel has a supporting surface in this embodiment.
Figure 8:
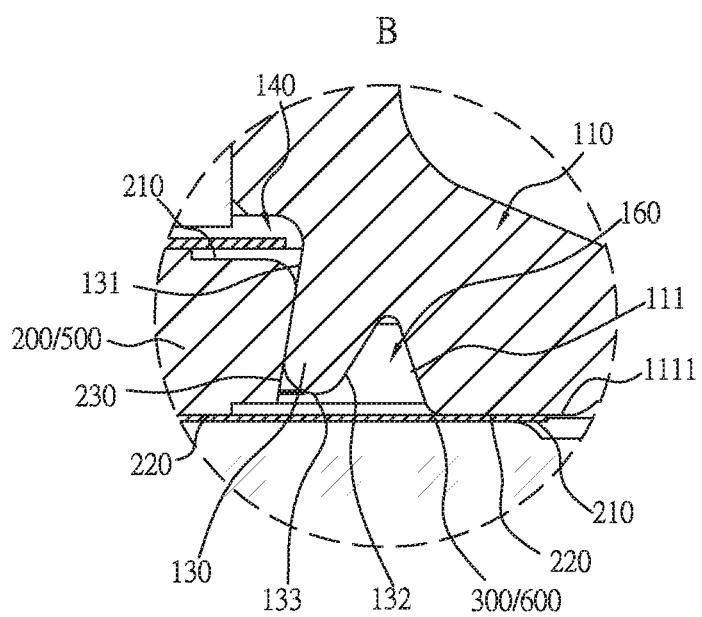
FIG. 8 is a partially enlarged view of part B in FIG. 7.
Figure 9:
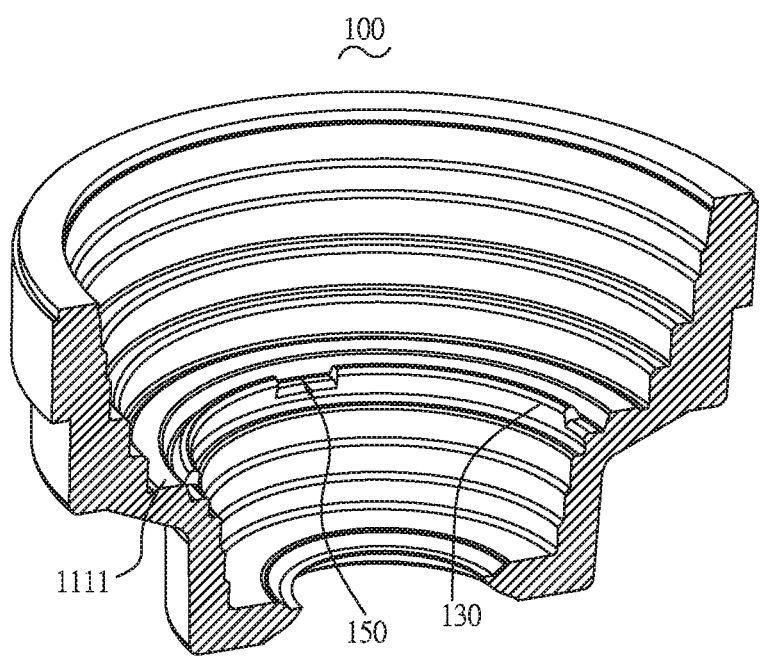
FIG. 9 is a perspective structural view of the lens barrel in FIG. 7 from a certain viewing angle.

FIG. 7 to FIG. 9 show a second embodiment provided by the present invention. The main technical features of this embodiment are substantially the same as those of the first embodiment, and the main differences from the first embodiment are as follow.

As shown in FIG. 7 to FIG. 9, a supporting surface 1111 is formed on the first inner side wall 111 of the barrel wall 110, wherein the supporting surface 1111 is resisted against the object side surface 210 of the second optical member 300. That is, the second optical member 300 is supported by the supporting surface 1111 so as to engage with the barrel wall 110. As shown in FIG. 8, the supporting surface 1111 is flush with the image side surface 220 of the first optical member 200 or there is a gap between the two. Understandably, in this case, the image side 220 of the first optical member 200 is not engaged with the object side 210 of the second optical member 300. Therefore, on the one hand, the first optical member 200 and the second optical member 300 can be arranged independently of each other, so that the components in the lens module 10 can be turned into two mutually independent wholes with the supporting surface 1111 as a watershed. On the other hand, the first optical member 200 is not deformed by being pressed by the second optical member 300.

In general, the lens barrel and the lens module of the present invention have at least the following characteristics. (1) It can better facilitate the installation of each component in the lens barrel (such as the lens, the light shielding sheet and the light shielding plate, etc.). (2) It can ensure the independence between the adjacent components installed before and installed after, which is beneficial to improve the stability of assembly. (3) It can provide more deformation possibilities for the installation of each component in the lens barrel, which is beneficial to improve the stability of assembly and to facilitate demolding and pulling-out molding.

Figure 10:
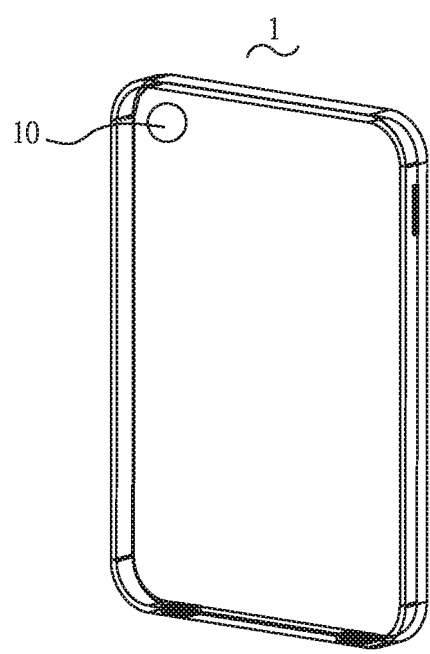
FIG. 10 is a perspective structural view of an electronic device according to the embodiment of the present invention.

As shown in FIG. 10, the present invention also provides an electronic device 1 including the above-mentioned lens module 10, wherein a specific structure of the lens module 10 can refer to the above-mentioned embodiments. Since all the technical solutions of all the above-mentioned embodiments are applied to the electronic device 11 of the present invention, it has at least all the beneficial effects brought by the technical solutions of the above-mentioned embodiments, so the details are not described here again. It should be noted that the electronic device 11 may be a mobile phone, a tablet computer, a notebook computer or the like.

The above description is only preferred embodiment of the present invention, and it should be noted that those skilled in the art can also make improvements without departing from the inventive concept of the present invention, but these improvements all belong to the protection scope of the invention.

What is claimed is:

1. A lens module, comprising a lens barrel and an optical component, wherein the lens barrel includes a barrel wall and a receiving cavity; the barrel wall includes a first inner side wall near an optical axis and a first outer side arranged opposite to the first inner side wall, a receiving cavity for accommodating the optical component is surrounded by the first inner side wall; the optical component includes an object side, an image side arranged opposite to the object side, and an outer side connecting the object side and the image side and far from the optical axis, and the optical component includes a first optical member;

the lens barrel further includes a clamping member protruding from the first inner side wall, and the clamping member is extended in a direction from an object side to an image side; the clamping member includes a second inner side wall close to the optical axis;

the second inner side wall of the clamping member is a sloped surface on a section paralleled to the optical axis, and the sloped surface is inclined from the object side to the image side toward a direction close to the optical axis; the second inner side wall is resisted against the outer side of the first optical member;

wherein the clamping member is provided with at least one notch on a side close to the image side, and in the radial direction of the barrel wall, each notch is extended from the second inner side wall toward a direction far from the optical axis.

2. The lens module according to claim 1, wherein the lens module is provided with a plurality of notches, and the plurality of notches are evenly distributed around the optical axis along the same circumferential direction of the clamping member.

3. The lens module according to claim 1, wherein the clamping member further includes a second outer side wall opposite to the second inner side wall, and a groove is formed between the second outer side wall and the first inner side wall.

4. The lens module according to claim 3, wherein the second outer side wall is smoothly connecting with the second inner side wall.

5. The lens module according to claim 1, wherein an angle between the second inner side wall and the optical axis is ranged from 0 degree to 20 degrees.

6. The lens module according to claim 1, wherein the optical member further includes a second optical member, the first optical member and the second optical member are sequentially distributed and adjacently arranged in a direction from the object side to the image side; the first inner side wall of the barrel wall has a supporting surface resisted against the object side surface of the second optical member; and the supporting surface is flush with the image side surface of the first optical member.

7. The lens module according to claim 1, wherein the optical member further includes a second optical member, the first optical member and the second optical member are sequentially distributed and adjacently arranged in a direction from the object side to the image side; the first inner side wall of the barrel wall has a supporting surface resisted against the object side surface of the second optical member; and the supporting surface and the image side surface of the first optical member has a gap.

8. The lens module according to claim 6, wherein the first optical member is a lens, the second optical member is a light shielding member.

9. The lens module according to claim 6, wherein the first optical member and the second optical member are two different types of light shielding members.

10. The lens module according to claim 8, wherein the light shielding member is a light shielding plate or a light shielding sheet.

11. An electronic device, wherein the electronic device includes the lens module according to claim 1.

* * * * *